… … …

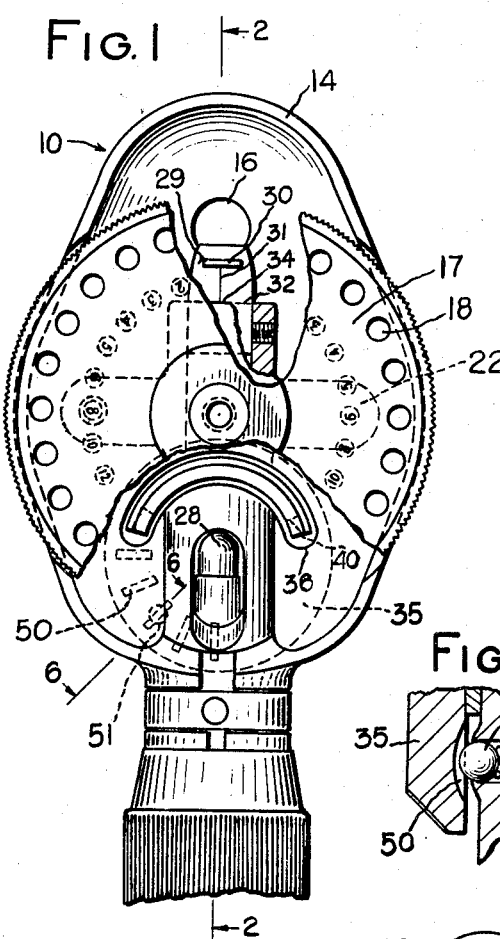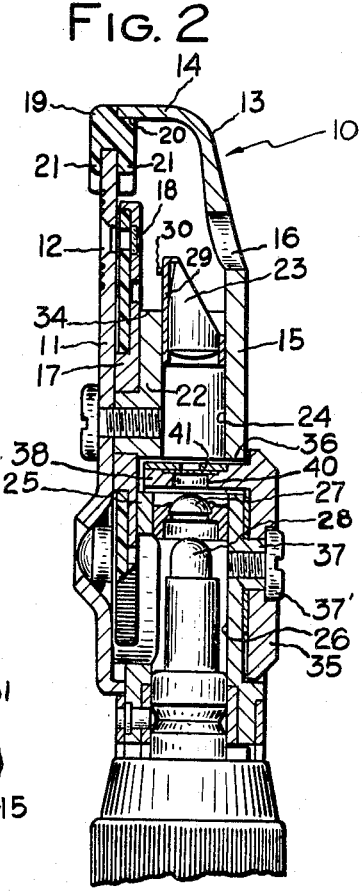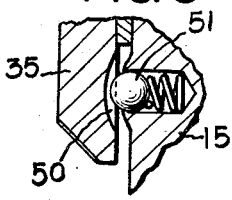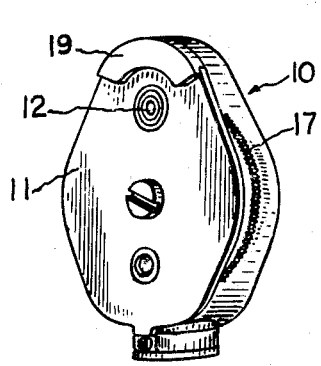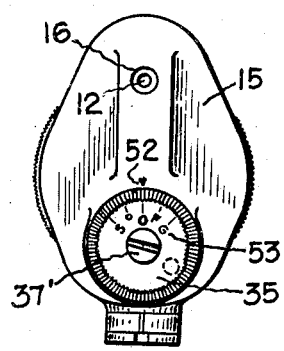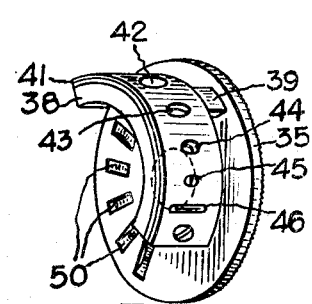
INVENTOR.
R. F. E. STEGEMAN
ATTORNEY

United States Patent Office 2,777,356
Patented Jan. 15, 1957

2,777,356

OPHTHALMOSCOPE

Raymond F. E. Stegeman, Greece, N. Y., assignor to Bausch & Lomb Optical Company, Rochester, N. Y., a corporation of New York Application December 3, 1953, Serial No. 395,862

1 Claim. (Cl. 88—22)

This invention relates to diagnostic instruments and more particularly it has reference to improved illumination variation means for ophthalmoscopes.

A primary object of this invention is to provide an ophthalmoscope having improved means for selectively varying the characteristics of a beam of light rays emitted from the instrument.

Another object of this invention is to provide an ophthalmoscope having a light beam modifying means that is simple, compact and sturdy in construction; that is economical to manufacture and maintain; and that is capable of performing its intended function in an efficient and accurate manner.

These and other objects and advantages reside in certain novel features of construction, arrangement and combination of parts as will hereinafter be more fully described in the specification, shown in the drawing, and pointed out in the appended claim.

Fig. 1 is a rear elevational view of an ophthalmoscope embodying my invention, with the rear cover removed and some parts shown broken away and in section.

Fig. 2 is a sectional view taken on the line 2—2 in Fig. 1.

Fig. 3 is a perspective view on a reduced scale of the rear of the instrument.

Fig. 4 is a perspective view on a reduced scale of the front of the instrument.

Fig. 5 is a perspective view of the apertured segment and attached disc.

Fig. 6 is an enlarged sectional view taken on the line 6—6 in Fig. 1.

A preferred embodiment of my invention is illustrated in the drawing wherein 10 indicates, generally, an ophthalmoscope comprising a removable cover plate 11, having a sight opening 12 through the upper portion thereof; a housing 13, having an integrally formed side wall 14 extending around the edge of the front wall 15 which has a sight opening 16 in alignment with the sight opening 12; and a rotatable lens disc 17, having a plurality of lenses 18 adapted to be selectively aligned with the sight openings 12 and 16.

A plastic head rest 19, having an undercut portion 20 for engagement with the side wall 14, has a pair of flanges 21 engaging over the upper edge of the cover plate 11. The coaction of said flanges with the edge of the plate, and of said undercut portion with the side wall serves to hold the head rest on the ophthalmoscope. Integrally formed on the inside of the front wall 15 is the hollow member 22 having a reflecting prism 23 mounted on one end of a bore 24 in optical alignment with the sight opening 16. Also integrally formed with the front wall 15 is another hollow member 25 having a bore 26 in which is mounted a condenser lens 27 and light source 28 in optical alignment with each other and with the reflecting prism 23.

The reflecting prism 23 is mounted in a tubular mount 29 which has a lip 30 on one side portion for use in aligning a pair of engraved cross lines 31, 32 with a fiducial line and a side 34 on the edge of the hollow member 22.

A flat circular disc member 35, beveled and knurled as shown in Fig. 4, is oscillatively mounted to turn about an axis on the lower portion of the outside front wall 15 of said housing 13 which has an arcuate slot 36 extending therethrough with its center on the axis of the disc. The disc 35 is mounted to turn on the projection 37 carried by the outside wall of the housing and it is held thereon by screw 37'. Disposed in the path of the beam of light rays within the housing is a segment 38 having a narrow neck portion 39 projecting through said arcuate slot 36 for rigidly connecting a peripheral portion of the disc 35 to the segment 38. The segment 38 is preferably cylindrical in shape with its concave portion facing the axis of the disc, as shown in Figs. 2 and 5, however, any suitable shape is to be considered within the scope of this invention. The neck portion 39 is narrow in circumferential width and is attached to an adjacent edge of the segment 38 for spacing said segment from said disc a distance sufficient to permit said disc and segment to be oscillated together without interfering with the front wall 15 of the housing. The axis of the segment 38, when said segment is cylindrical in shape, and the axis of the disc 35 are substantially coincident with the axis of oscillation of said segment and disc. Extending along and through the segment 38 is an elongated slot 40 which is covered by a plate 41 having a plurality of apertures 42, 43, 44, 45 and 46 in alignment with said slot 40. The plate 41 and segment 38 may be made integral without departing from the spirit of my invention.

Formed in the back of the disc 35, diametrically opposite the apertures 42, 43, 44, 45 and 46, are the detents 50 which are adapted to be engaged by a spring biased ball 51 for correctly positioning the selected aperture in the path of the beam of light rays. Engraved on the outside front wall 15 of the housing 13 is an index marker 52 coacting with indicia 53 on the disc 35 whereby the selected indicium will indicate which aperture is aligned in the path of the beam of light rays.

The apertures in the plate 41 have different sizes and shapes as well as having different filters and reticles of appropriate design. In the set of apertures shown, 44 is a large round aperture, 45 is a small round aperture, 46 is a slit aperture, 43 is a round aperture containing a red-free filter, while 42 is a round aperture containing a grid pattern reticle. Each aperture when positioned in the path of the beam of light rays will appropriately vary the character of said beam accordingly. These apertures, filters and reticles are illustrative of only five of the many various types of apertures, filters and reticles that may be used and the illustrated ones are not to be considered as limiting the invention.

In operation, a beam of light rays will pass from the light source 28 and condenser lens 27 through the selected aperture in the segment 38 where said beam will be modified according to the characteristics of the selected aperture. After emerging from the segment, the beam will be reflected by the prism 23 through the sight opening 16 into the eye of a patient.

From the foregoing, it will be apparent that I am able to attain the objects of my invention and provide an improved ophthalmoscope having a new light beam modifying unit. The oscillatively mounted disc and segment are uniquely interconnected by the neck portion so as to provide an improved and more efficient actuating system for the device. The new light beam modifying unit is simple, compact and sturdy requiring little or no repair and adjustment once it is mounted in the ophthalmoscope. Various modifications may obviously be made without departing from the spirit of my invention as pointed out in the appended claims.

I claim:

In an ophthalmoscope having a housing in which is positioned a light source, a condenser lens and a reflecting prism in optical alignment with each other, the combination of means for varying the character of a beam of light passing from said light source and lens to said prism, said means comprising a disc mounted to turn about an axis on the outer portion of the front wall of the housing, a cylindrical segment positioned within the housing above the lens in the path of light rays and having its concave portion facing the axis of the disc, said segment having a plurality of light modifying apertures, a narrow neck portion rigidly connecting the edge of the segment to the peripheral portion of the disc, the lower front wall of the housing having an arcuate slot through which the neck portion projects whereby the light modifying apertures may be brought selectively into alignment with the path of light rays by turning the disc.

References Cited in the file of this patent

UNITED STATES PATENTS

| | | |
|---|---|---|
| 1,566,652 | Clement | Dec. 22, 1925 |
| 2,269,962 | Wappler | Jan. 13, 1942 |

FOREIGN PATENTS

| | | |
|---|---|---|
| 676,843 | Great Britain | Aug. 6, 1952 |